J. C. SNYDER.
TRANSMISSION UNIT FOR POWER SHAFTS.
APPLICATION FILED APR. 23, 1921.
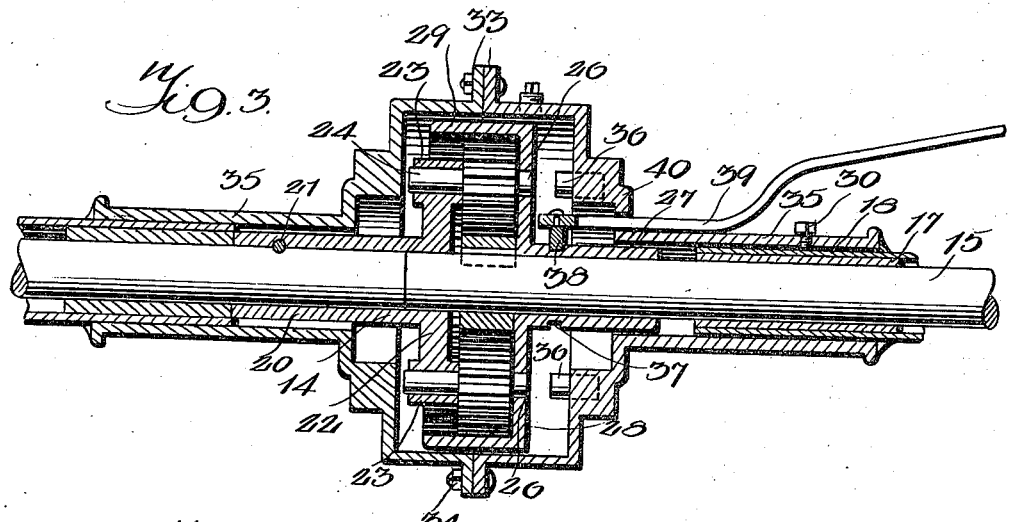
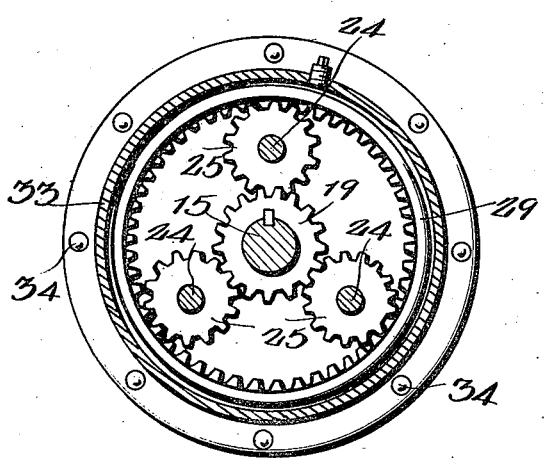
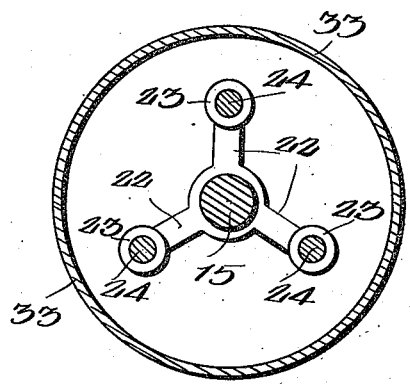
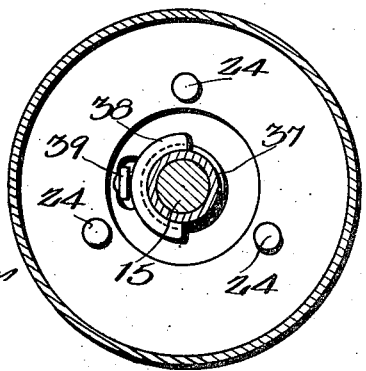
INVENTOR
J. C. SNYDER,
BY
ATTORNEYS

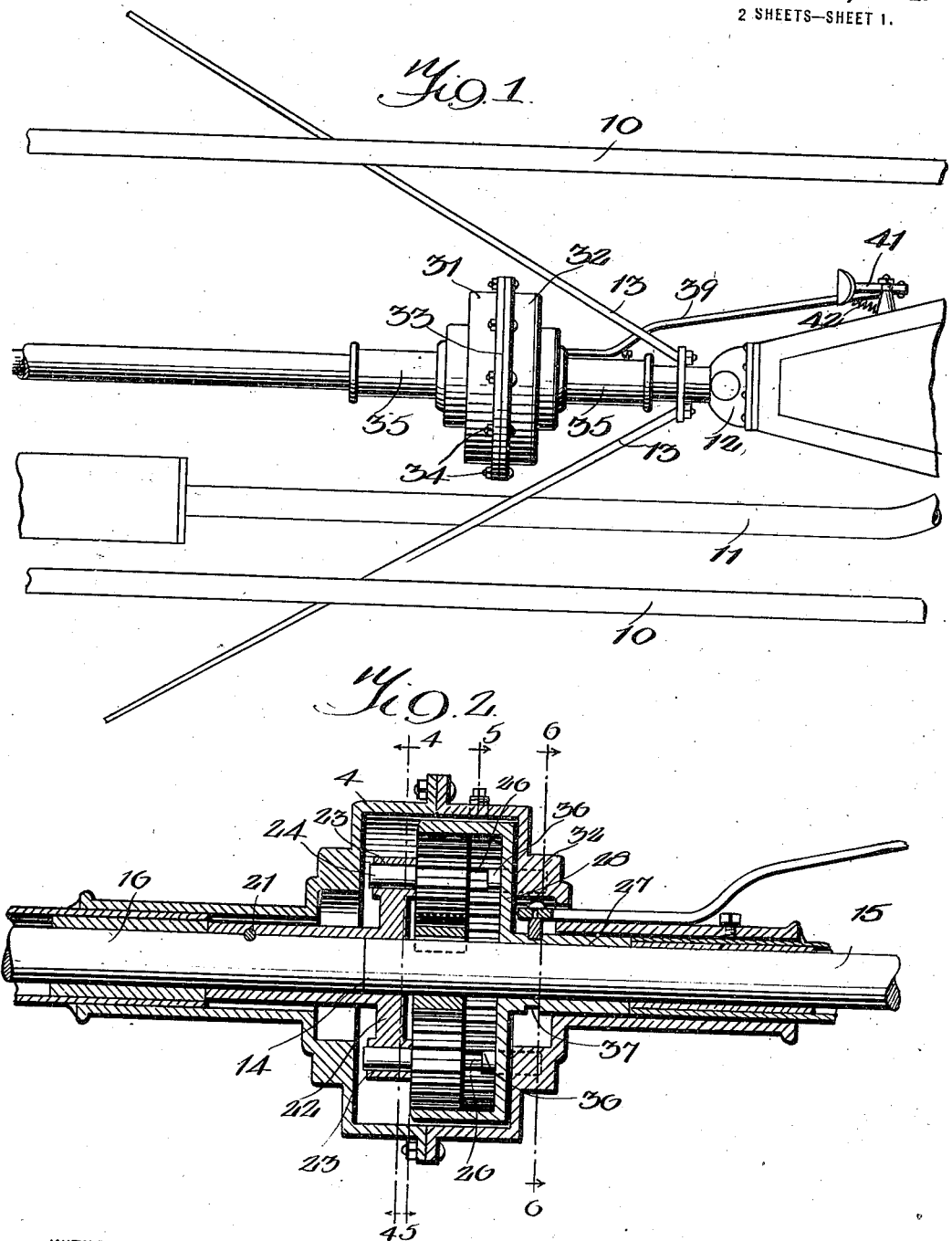

UNITED STATES PATENT OFFICE.

JESSE C. SNYDER, OF FROSTBURG, MARYLAND.

TRANSMISSION UNIT FOR POWER SHAFTS.

1,413,943.             Specification of Letters Patent.     Patented Apr. 25, 1922.

Application filed April 23, 1921. Serial No. 463,792.

*To all whom it may concern:*

Be it known that I, JESSE C. SNYDER, a citizen of the United States, and a resident of Frostburg, in the county of Allegany and State of Maryland, have invented certain new and useful Improvements in Transmission Units for Power Shafts, of which the following is a specification.

This invention relates to a transmission unit for power shafts.

The object of the invention is to provide a transmission unit of the above character which may be separately associated with a power shaft, and operated in conjunction with another transmission unit connected with the same shaft in such a manner that an additional driving speed of said shaft may be had.

It may be here mentioned that my invention is particularly adapted for automobiles, and particularly such as the Ford type of manufacture in which the transmission unit permits only a high speed and low speed of the driving shaft to be had.
In carrying out the present invention it is contemplated providing another transmission unit for the driving shaft of such a construction that an intermediate speed of the driving shaft can be had when desired.
The present invention is illustrated by way of example in the accompanying drawings, in which:

Figure 1 is a detail plan view showing my invention when incorporated with the drive shaft of a Ford automobile, Figure 2 is a vertical longitudinal section of my invention showing the parts of same in operative position, Figure 3 is a view similar to that shown in Figure 2, but showing the parts of the invention in their non-operative position, Figures 4, 5 and 6 are transverse sections taken substantially on the lines 4—4, 5—5, and 6—6, respectively of Figure 2.
Referring to the drawings more particularly, 10 indicates the side frame members of the automobile, 11 the exhaust pipe, 12 the universal joint housing or casing, and 13 the radius rods. The usual transmission gearing is of course located forward to the universal coupling as is well known. In the present instance the drive shaft which extends from the universal coupling to the differential is divided as at 14 to form a forward power shaft section 15 and a rearward shaft section 16. Both shaft sections are provided with the usual bearing sleeve 17 which is surrounded by a tubular member 18 likewise of the customary construction. In the present instance, however, each bearing sleeve 17 and tubular member 18 terminate at a point near the meeting ends of the shaft sections 15 and 16, as shown, in Figures 2 and 3. At a point near the rear end of the shaft section 15 there is keyed a pinion 19. The forward end of the shaft section 16 is surrounded by a sleeve 20, said sleeve also telescoping a portion of the rear end of the shaft section 15. The sleeve 20 is secured against movement with respect to the shaft section 16 by means of a pin 21, while the shaft 15 is free to revolve within the sleeve. On the forward end of the sleeve 20 there is formed a plurality of radial arms 22, said arms having each formed on their outer ends a bearing 23. In each of the bearings 23 is journaled a stub shaft 24, and each of said stub shafts have formed therewith a gear 25, each of which are adapted to mesh with the pinion 19 carried upon the power shaft section 15. The stub shafts 24 also slightly extend from the forward sides of the gears 25, as shown at 26, the purpose of which will later become evident.

Forward to the pinion 19 there is positioned upon the power shaft section 15 a sleeve 27, said sleeve terminating at its rear end in an annular flange 28, and said flange having formed therewith an internal ring gear 29 with which the gears 25 are adapted to continually mesh. The forward end of the sleeve 27 is normally in spaced relation with the rear ends of the tubular member 18 and bearing sleeve 17 which surround the power shaft section 15, as shown in Figure 3. The annular flange 28 of the sleeve 27 is formed with a plurality of openings which are in alinement and adapted to receive the projecting portions 26 of the stub shafts 24.

A pair of complemental casing or housing sections 31 and 32 encircle the ring gear 29, said housing sections having bolting flanges 33 by which they may be secured together by the means of bolts, as indicated at 34. The housing sections are also each formed with an extended hub portion 35 which telescope the tubular members 18, as shown in Figures 2 and 3.

The forward housing section 32 is secured against rotation with respect to the forward tubular member 18 by the means of a set screw as indicated at 30. Also the hub portion of the forward housing 32 has projecting therefrom a plurality of pins or studs 36 one for each of the stub shafts 24 and in longitudinal alinement therewith.

In the sleeve 27 there is provided an annular groove 37 in which there is positioned a yoke 38, said yoke having connected therewith a rod 39 which extends through an opening 40 provided in the hub portion of the forward housing section 32. The forward end of the rod 39 is suitably connected to the lower end of a foot pedal 41, said pedal being suitably pivoted at a central point thereof to the one side of the universal coupling housing 12 as shown in Figure 1. Also there is provided a coil spring 42 which has one of its ends connected with the rod 39 and its other end with the casing 12 and adapted to normally urge the rod 39 in a forward direction.

In the operation of the present device, assuming that the parts thereof have the position as shown in Figure 3, the operation thereof will be as follows: The power shaft section 15 will of course be driven either at a high or low rate of speed depending upon the manner in which the main transmission associated therewith has been operated. In either instance the forward power shaft section 15 and rear section 16 will be directly connected by the present transmission unit, this for the reason that the ring gear 29 has been moved in position so that the openings formed in the hub portion thereof engage each projecting portion 26 of stub shafts 24 and said ring gear is locked against movement with respect to the gears 25. The action of the pinion 19 would then be to lock the gears 25 and the ring gear 29 as a whole and the same would move or rotate as a unit, and thereby transmit the rotative motion of the shaft section 15 to the rear shaft section 16, direct. As before stated, this would occur when the power shaft section 15 was connected for either high speed or low speed through the main transmission. When it is desired to obtain an intermediate speed for the drive shaft the main transmission is operated for driving the shaft at high speed. At the same time the pedal 41 is operated for moving the sleeve 27 forwardly so that the openings formed in the flange 28 thereof will be engaged by the pins 36, and thus lock the ring gear 29 against rotative movement. When this occurs the gears 25 will of course still remain in mesh with the ring gear 29 due to the width of said ring gear. The turning of the power shaft section 15 through the pinion 19 will cause the gears 25 to track upon the internal ring gear 29, and in this way transmit rotative motion to the rear shaft section 16, at less speed than that at which the forward shaft section 15 is rotated, the speed of the rear shaft section 16 being such that it may be called an intermediate speed.

While I have shown and described the preferred form of my invention it is to be understood that I am aware of the fact that the construction, combination and arrangement of parts may be changed by those skilled in the art without departing from the spirit of my invention as indicated by the appended claims.

I claim:

1. In combination, a power shaft, a second shaft in end alignment with the power shaft, a pinion secured to the power shaft adjacent its end opposing the second shaft, a sleeve secured upon the forward or opposing end of the second shaft, a spider formed upon the forward end of the sleeve for rotatably supporting a plurality of pinions arranged in circular formation, an internal ring gear rotatably and slidably supported by the power shaft, a stationary housing enclosing the ring gear, and also means whereby with the forward shifting of said ring gear the same may be locked against rotation.

2. In combination, a power shaft, a second shaft in end alignment with the power shaft, a pinion secured to the power shaft adjacent its end opposing the second shaft, a sleeve secured upon the forward or opposing end of the second shaft and having a portion extending forwardly for journaling a rear end portion of the power shaft, a spider formed upon the forward end of the sleeve for rotatably supporting a plurality of pinions arranged in circular formation, an internal ring gear rotatably and slidably carried by said power shaft forward to said pinion and adapted to constantly mesh with said pinions and adapted to be moved longitudinally of the power shaft a predetermined degree in either direction without disengagement with said pinion, said internal ring gear having a web portion formed with a plurality of openings, a stationary housing about said internal ring gear, and studs projecting from the inner side of said housing adapted to enter the openings of the web of said internal ring gear when said gear is moved to its forward position.

3. In combination, a power shaft, a second shaft in end alignment with the power shaft, a pinion secured to the power shaft adjacent its end opposing the second shaft, a sleeve secured upon the forward or opposing end of the second shaft and having a portion extending forwardly for journaling a rear end portion of the power shaft, a spider formed upon the forward end of the sleeve for rotatably supporting a plurality of pinions arranged in circular formation, an internal ring gear rotatably and slidably carried by said power shaft forward to said pinion and adapted to constantly mesh with said pinions and adapted to be moved longitudinally of the power shaft a predetermined degree in either direction without disengagement with said pinion, said internal ring gear having a web portion formed with a plurality of openings, a stationary housing about said internal ring gear, studs projecting from the inner side of said housing adapted to enter the openings of the web of said internal ring gear when said internal ring gear is moved to its forward position, and a stub shaft projecting from the forward side of each pinion adapted to enter the opening in the web of said ring gear when said ring gear is moved to its rearward position.

4. In combination, a power shaft, a second shaft in end alignment therewith, a pinion carried by the power shaft, a sleeve secured to the opposing end of the second shaft, a plurality of radial arms formed with said sleeve, a pinion rotatably supported in the outer end of each arm and disposed forwardly thereto and each pinion adapted to continuously mesh with the pinion carried by the power shaft, a stub shaft projecting from the forward side of each pinion carried by the radial arms, an internal ring gear surrounding the last named pinions and adapted to continuously mesh therewith and also adapted to permit lateral movement thereof without disengaging from said pinions, said ring gear having its one end closed by its web and said web being formed with a plurality of openings adapted to receive the projecting stub shafts from the pinions carried by the radial arms when said ring gear is moved to its rearmost position, a stationary housing surrounding the ring gear, and studs projecting from the inner and forward wall of the housing adapted to enter the opening in the web of said ring gear when said ring gear is moved forwardly.

JESSE C. SNYDER.